United States Patent
Taylor et al.

(10) Patent No.: US 12,495,237 B2
(45) Date of Patent: Dec. 9, 2025

(54) INTERACTIVE HEADPHONE SYSTEM FOR STORING AND PLAYING AUDIO CONTENT

(71) Applicant: Kekz GmbH, Munich (DE)

(72) Inventors: Carl Simon Taylor, Munich (DE); Adin Timothy Mumma, Munich (DE)

(73) Assignee: Kekz GmbH, Munich (DE)

( * ) Notice: Subject to any disclaimer, the term of this patent is extended or adjusted under 35 U.S.C. 154(b) by 265 days.

(21) Appl. No.: 18/020,913

(22) PCT Filed: Aug. 10, 2021

(86) PCT No.: PCT/EP2021/072292
§ 371 (c)(1),
(2) Date: Feb. 10, 2023

(87) PCT Pub. No.: WO2022/034094
PCT Pub. Date: Feb. 17, 2022

(65) Prior Publication Data
US 2023/0308797 A1    Sep. 28, 2023

(30) Foreign Application Priority Data

Aug. 11, 2020 (DE) .......................... 102020121117.1

(51) Int. Cl.
*H04R 1/10*       (2006.01)
*G06F 21/10*      (2013.01)
*H04R 5/033*      (2006.01)

(52) U.S. Cl.
CPC ........... *H04R 1/1041* (2013.01); *G06F 21/10* (2013.01); *H04R 5/033* (2013.01); *H04R 2201/103* (2013.01); *H04R 2420/07* (2013.01)

(58) Field of Classification Search
CPC .................. H04R 1/1041; H04R 5/033; H04R 2201/103; H04R 2420/07; G06F 21/10
(Continued)

(56) References Cited

U.S. PATENT DOCUMENTS 6,466,677 B1    10/2002   Bush
6,704,428 B1     3/2004   Wurtz
(Continued)

FOREIGN PATENT DOCUMENTS

CN    102752681 A    10/2012
CN    104918158 A     9/2015
(Continued)

OTHER PUBLICATIONS

Dempsey "Teardown: Toniebox Music Player," Retrieved from, https://eandt.theiet.org/content/articles/2018/09/teardown-toniebox-music-player, Sep. 19, 2018, 4 Pages.
(Continued)

*Primary Examiner* — Vivian C Chin
*Assistant Examiner* — Con P Tran
(74) *Attorney, Agent, or Firm* — Davis Wright Tremaine LLP (57) ABSTRACT

The invention relates to an interactive headphone system for storing and playing audio content comprising an NFC tag with an RFID code that contains a distinctive identification of the NFC tag, and headphones that comprise a memory that stores one or more audio files, where each of the one or more audio files is associated with a distinctive identification, where the one or more audio files are locked so that access is possible only with an RFID code containing a distinctive identification corresponding to the distinctive identification of a respective audio file, and an NFC reader, where, when the NFC tag having a distinctive identification corresponding to the distinctive identification of a respective audio file is brought into the immediate vicinity of the NFC reader, the headphones are configured to: process the RFID code containing the distinctive identification of the NFC tag; correlate the distinctive identification of the NFC tag with the distinctive identification of the audio file stored on the
(Continued)

memory; unlock the audio file; and automatically start playback of the audio file.

20 Claims, 5 Drawing Sheets

(58) Field of Classification Search
USPC ......... 381/74, 150, 370, 374, 395, 412, 419; 455/41.1, 41.2, 41.3
See application file for complete search history.

(56) References Cited

U.S. PATENT DOCUMENTS

| | | | |
|---|---|---|---|
| 8,126,157 | B2 | 2/2012 | Buil et al. |
| 8,249,650 | B2 | 8/2012 | Rofougaran et al. |
| 8,335,312 | B2 | 12/2012 | Gerhardt et al. |
| 9,100,775 | B2 | 8/2015 | Rosener |
| 10,263,668 | B2 | 4/2019 | Li et al. |
| 10,583,370 | B2 | 3/2020 | Fattal |
| 2006/0045304 | A1 | 3/2006 | Lee et al. |
| 2006/0219776 | A1* | 10/2006 | Finn ............. G06K 7/0043 235/380 |
| 2008/0122704 | A1 | 5/2008 | King |
| 2008/0157991 | A1 | 7/2008 | Raghunath et al. |
| 2009/0097672 | A1* | 4/2009 | Buil ............. G06F 21/10 380/283 |
| 2010/0183183 | A1 | 7/2010 | Bae et al. |
| 2014/0176306 | A1* | 6/2014 | Lee ............. G06K 7/10237 340/10.1 |
| 2014/0279479 | A1 | 9/2014 | Maniar et al. |
| 2015/0068014 | A1* | 3/2015 | Salmon ............. H01F 7/021 29/428 |
| 2016/0220876 | A1* | 8/2016 | Savarese ............. A63B 60/06 |
| 2016/0294902 | A1 | 10/2016 | Camurri et al. |
| 2016/0315931 | A1* | 10/2016 | Chiaramonti ......... G06Q 20/34 |
| 2018/0324515 | A1* | 11/2018 | Boesen ............. H04R 1/1041 |

FOREIGN PATENT DOCUMENTS

| | | |
|---|---|---|
| DE | 29905208 U1 | 9/1999 |
| DE | 202005006249 U1 | 7/2005 |
| DE | 102008007484 A1 | 8/2009 |
| DE | 102011056420 A1 | 6/2013 |
| DE | 202015009646 U1 | 11/2018 |
| EP | 2833297 A1 | 2/2015 |
| EP | 1719039 B1 | 11/2015 |
| ES | 1076522 U | 3/2012 |
| JP | 2007233824 A | 9/2007 |
| WO | 2006027257 A1 | 3/2006 |

OTHER PUBLICATIONS

FCC ID.io "TIMIO Player: Internal Photos," FCC ID Database, Retrieved from, https://fccid.io/2AUE7-TM0101/Internal-Photos/Internal-Photos-4481983, Apr. 15, 2020, 5 Pages.

Flynt, "10 Best NFC Headphones," Retrieved from, https://3dinsider.com/nfc-headphones/, Oct. 7, 2018, 22 Pages.

GSMarena "Apple to Unlock the NFC Chips on its iPhones for Broader Use," Retrieved from, https://www.gsmarena.com/newscomm-31301.php, May 26, 2018, 4 Pages.

International Search Report and Written Opinion for Application No. PCT/EP2021/072292, Mailed Jan. 28, 2022, filed Aug. 10, 2021.

Jabra GN "FAQ Jabra Syle White," Retrieved from, https://www.jabra.com/supportpages/jabra-style/100-99600001-02/faq/what-is-near-field-communication-nfc, Undated, 4 Pages.

Sony, "Help Guide—Wireless Noise Canceling Stereo Headset," Retrieved from, https:/helpguide.sony.net/mdr/wh1000xm3/v1/en/contents/TP0001703131.html#:~:text=By%20touching%20the%20headset%20with,and%20makes%20a%20Bluetooth%20connection.&text=NFC%20(Near%20Field%20Communication)%20is,as%20smartphones%20and%20IC%20tags, 2018, 3 Pages.

Tiedemann et al. "NFC and Bluetooth: The Perfect Pair," Retrieved from, http://web.archive.org/web/20181123221916/https://nfc-forum.org/nfc-and-bluetooth-the-perfect-pair/, Jul. 11, 2014, 3 Pages.

Tobias "Toniebox Teardown," Retrieved from, https://www.ifixit.com/Teardown/Toniebox+Teardown/106148, Apr. 26, 2018, 8 Pages.

Wikipedia, "RFID," Retrieved from, https://de.wikipedia.org/w/index.php?title=RFID&oldid=202280441, Jul. 28, 2020, 31 Pages.

Xiaomi Community, "Xiaomi," Retrieved from, https://c.mi.com/thread-1998914-1-0.html <https://protect-us.mimecast.com/s/50Y3CW68o5H4v0XrhpSqA0?domain=c.mi.com, 2016, 2 Pages.

Isakeit et al., "Toniebox Teardown," Retrieved from, https://www.ifixit.com/Teardown/Toniebox+Teardown/106148, Apr. 26, 2018, 8 Pages.

Office Action for Australian Application No. 2021325349, mailed Aug. 31, 2023, 4 pages.

Pearl.Gmbh, "Instruction Manual for the MPH-232.SD Headphones," Jul. 2012, 51 Pages.

Sony, "Instuction Manual for the Compact Disc Player," 1989, 6 Pages.

Eidtmann, "Toniebox: How to Fast Forward, Pause & More," Retrieved from, https://www.otto.de/updated/ratgeber/toniebox-vorspulen-anhalten-und-co-78261/#anhalten-so-macht-tonie-eine-pause, Jan. 6, 2020, 9 Pages.

Office Action for German Application No. 102020121117.1, mailed May 5, 2021, 12 Pages.

Timio "Timio—Frequently Asked Questions," Retrieved from, <https://web.archive.org/web/20230202203010/https://us.timio.co/pages/frequently-asked-question>, Feb. 2, 2023, 7 Pages.

Wikipedia the Free Encyclopedia, "Near-Field Communication," https://web.archive.org/web/20230204193345/https://en.wikipedia.org/wiki/Near-field_communication, Feb. 4, 2023, 24 Pages.

* cited by examiner

INTERACTIVE HEADPHONE SYSTEM FOR STORING AND PLAYING AUDIO CONTENT

CROSS REFERENCE TO RELATED APPLICATIONS

This application is a 371 National Stage Patent Application of International Patent Application No. PCT/EP2021/072292, filed Aug. 10, 2021, which claims priority to German Patent Application No. 102020121117.1, filed Aug. 11, 2020, the disclosures of which are incorporated herein by reference in their entirety.

TECHNICAL FIELD

The invention relates to an interactive headphone system for storing and playing audio content as well as headphones, which has stored audio files and a chip, in particular made of plastic, which can unlock an audio file stored on a playback device for playback.

BACKGROUND

Headphones are now available to the end user in numerous different variants, be it as wired headphones or as a wireless variant in which the radio signal is transmitted, for example, via Bluetooth. Furthermore, the user can choose between variants such as in-ear headphones, earbud headphones, or cup headphones (e.g. as an "on-ear" or as an "over-ear" variant). With most headphones, the content being played is not stored on the headphones, but on a playback medium to which the headphones are connected either in a wired or wireless manner. Such a playback medium can be, for example, a smartphone, a computer, a tablet, or an MP3 player. In this common form, the user can typically select the content to be played using control elements and/or a user interface.

Furthermore, there are also a few headphones that have their own memory on which content to be played can be stored. This type of headphones typically does not necessarily require a connection to a smartphone, tablet, etc. to play audio content and can be controlled by way of control elements integrated into the headphones. Traditionally, the user can upload data to the memory manually, for example, via a wired or wireless connection to a computer.

Current headphones are only used for directly playing audio files, which may be stored on the headphones, without access to the audio files themselves being locked. This is not intuitive at first, especially for headphones with data stored on the headphones, since known headphones do not provide any feasible functionality for unlocking audio content. For audio content stored on a smartphone, tablet, etc., traditionally only access restriction for the device itself exists, for example, in the form of a PIN number.

DETAILED DESCRIPTION

In particular, selective, intuitive, and only temporary unlocking and thereafter automatic playback of individual audio content stored on the headphone memory has not yet been possible.

The object of the present invention is therefore to release audio content stored on headphones intuitively and selectively for playback.

The present invention overcomes the issues addressed and solves the object by an Interactive headphone system, in particular for children, for storing and playing audio content, as well as headphones which have audio files stored and a chip, in particular made of plastic, which can unlock audio files for playback stored on a playback device, in particular on headphones. The underlying technology relates to an interaction between a near-field communication tag, hereinafter referred to as an NFC tag, and a near-field communication reader, hereinafter referred to as an NFC reader, where the NFC reader is a component of the headphones and the NFC tag, when being brought into the immediate vicinity of the NFC reader, can unlock specific audio content stored on the headphones and automatically start playing that specific audio content.

The interactive headphone system according to the invention and the headphones according to the invention, as well as the chip according to the invention, in particular made of plastic, have the advantage that audio content stored selectively on headphones can be unlocked and automatically played, where the user must simply bring a corresponding NFC tag into the immediate vicinity of the NFC reader of the headphones. This simplifies user interaction, since no control elements have to be actuated, for example, to start playback. Furthermore, a licensor or a chaperon, for example a supervisor or a parent, can control which audio content the user can play over the headphones in that NFC tags, or in some embodiments plastic chips with embedded NFC tags, are made available to the user of the headphones only selectively.

The interactive headphone system according to the invention for storing and playing audio content comprises an NFC tag with an RFID code that contains a distinctive identification of the NFC tag, and headphones that comprise a memory that stores one or more audio files, where each of the one or more audio files is associated with a distinctive identification, where the one or more audio files are locked so that access is possible only with an RFID code containing a distinctive identification corresponding to the distinctive identification of a respective audio file, and an NFC reader, where, when the NFC tag having a distinctive identification corresponding to the distinctive identification of a respective audio file is brought into the immediate vicinity of the NFC reader, the headphones are configured to: process the RFID code containing the distinctive identification of the NFC tag; correlate the distinctive identification of the NFC tag with the distinctive identification of the audio file stored on the memory; unlock the audio file; and automatically start playback of the audio file.

In an embodiment, the system is characterized in that playback is ended automatically when the NFC tag is removed from the immediate vicinity of the NFC reader. In this context, to end can mean that playback is aborted as well as that the playback is interrupted.

In an embodiment, the system is characterized in that the NFC tag is embedded in a chip, in particular made of plastic.

In a further embodiment, the system is characterized in that the NFC tag has a substantially radially symmetrical, in particular a ring-shaped, geometry.

In an embodiment, the system is characterized in that the headphones furthermore comprise a magnet, in particular a magnetic surface in the immediate vicinity of the NFC reader, and the chip is configured such that the chip can be attached magnetically to the headphones for unlocking and playing audio content.

In another embodiment, the system is characterized in that a magnetized or magnetizable component is embedded in the chip to magnetically attach the chip to the headphones.

In an embodiment, the system is characterized in that the chip has at least one planar surface and a magnetic surface of the headphones is planar such that the chip can be attached magnetically to the headphones in that one of the at least one planar surface of the chip and the planar magnetic surface of the headphones are made to substantially contact.

In an embodiment, the system is characterized in that the housing of the chip has radial symmetry and the NFC tag is embedded centrally in the chip and is oriented parallel to one of the at least one planar surface of the chip.

In an embodiment, the system is characterized in that the chip has a substantially plano-convex geometry, i.e. a planar surface and a convex surface.

In an alternative embodiment, the system is characterized in that the chip has a substantially cylindrical geometry.

In an embodiment, the system is characterized in that the magnetized or magnetizable component is embedded in the chip in a ring-shaped manner, where the magnetized or magnetizable component is oriented parallel to one of the at least one planar surface of the chip.

In an embodiment, the system is characterized in that the planar magnetic surface of the headphones forms a base surface of a first cavity, where the first cavity has a geometry which is suitable to affix the chip in the lateral direction.

In an embodiment, the system is characterized in that the first cavity has a circular base surface.

In an embodiment, the system is characterized in that a second cavity is defined on a part of the base surface of the first cavity such that the attached magnetically chip is tilted by applying pressure to the chip surface overlapping the second cavity and can thereby be removed from the headphones.

In an embodiment, the system is characterized in that the surface of the second cavity is not magnetic so that the chip attached to the magnetic base surface can be pulled back to the magnetic base surface of the first cavity by magnetic pull force if it accidentally tilts into the second cavity.

In an embodiment the system is characterized in that the first cavity has a circular base surface, the second cavity is defined on a circular segment of this circular base surface and forms an inclined plane having a constant angle with respect to the circular base surface of the first cavity.

In an embodiment, the system is characterized in that, following the embedding of one or more components, the two halves of the chip are welded together by ultrasonic welding.

In an embodiment, the system is characterized in that a file history of the file played, the file played (specifically, for example, the name of the file and/or the path where the file is stored), the distinctive identification of the NFC tag, and a time stamp are recorded.

In an embodiment, the system is characterized in that the playback of the audio file continues seamlessly, in particular at the point in the content where playback was ended, when the NFC tag is again brought into the immediate vicinity of the NFC reader after playback has ended.

In an embodiment, the system is characterized in that the headphones furthermore comprise an infrared sensor configured to detect whether the headphones are being worn by a person.

In an embodiment, the system is characterized in that the automatic playback of the audio file takes place only if the infrared sensor detects that the headphones are being worn by a person.

In a further embodiment, the system is characterized in that the NFC tag is a passive tag.

In an embodiment, the system is characterized in that the headphones are cup headphones. In an embodiment, the system is characterized in that the headphones have a corrugation on the headphone cups. In an embodiment, the system is characterized in that the NFC reader and the magnetic surface are attached to the right headphone cup.

In an embodiment, the magnet and the magnetized or magnetizable component are configured such that a noise at the user's ear by attaching the chip by the magnetic pull force at the surface is below a threshold value. The threshold value can comprise a sound pressure level of between 80 dB and 120 dB, for example, 85 dB, 90 dB or 100 dB.

In an embodiment, the headphones are configured to: receive a complementary audio file from the NFC tag; supplement the audio file stored on the memory with the complementary audio file from the NFC tag for the playback of the audio file when the NFC tag with the distinctive identification is brought into immediate vicinity of the NFC reader. The audio file (430; 450) stored on the memory can be incomplete and be completed by the complementary audio file. The headphones can be configured to only play complete audio files. For example, all of the one or more audio files stored on the memory can be incomplete and each be completed only by receiving a complementary audio file. The complementary audio file received can be encrypted and the headphones can be configured to decrypt the encrypted complementary audio file received. The audio files stored on the memory can be encrypted. The headphones can be configured to decrypt the audio files stored on the memory of the headphones using the encrypted complementary audio files received. This allows the audio files to be protected from unauthorized access.

The headphone according to the invention comprises a memory in which one or more audio files are stored, where each of the one or more audio files is associated with a distinctive identification, and where the one or more audio files are locked so that access is possible only with an RFID code containing a distinctive identification corresponding to the distinctive identification of a respective audio file; and an NFC reader configured to read out a distinctive identification of an NFC tag brought into immediate vicinity of the NFC reader of the headphones, causing the headphones to: compare the distinctive identification of the NFC tag with distinctive identifications of audio files stored on the memory; unlock a corresponding audio file in the event that the distinctive identification of the NFC tag matches a distinctive identification of an audio file stored; and start playing the corresponding audio file automatically.

In an embodiment, the system is characterized in that playback is automatically ended when the NFC tag is removed from the immediate vicinity of the NFC reader. In this context, to end can mean that the playback is aborted as well as that the playback is interrupted.

In an embodiment, the headphones are characterized in that the headphones furthermore comprise a magnet, in particular a magnetic surface, in the immediate vicinity of the NFC reader so that a further device that has a further magnetic or magnetizable component in addition to the NFC tag for unlocking and playing audio content can be attached magnetically to the headphones.

In an embodiment, the headphones are characterized in that the magnetic surface of the headphones is planar such that the further device can be attached magnetically to the headphones in that a planar surface of the further device and the planar magnetic surface of the headphones are made to substantially contact.

In an embodiment, the headphones are characterized in that the magnetic surface forms a base surface of a first cavity. In an embodiment, the headphones are characterized in that the first cavity is dimensioned in such a way that the further device can be inserted into the first cavity. In an embodiment, the headphones are characterized in that the first cavity has a circular base surface. In an embodiment, the headphones are characterized in that a second cavity is defined on a part of the base surface of the first cavity such that further attached magnetically device can be tilted and thereby removed from the headphones.

In an embodiment, the headphones are characterized in that the surface of the second cavity is not magnetic so that the further device attached to the magnetic base surface can be pulled back to the magnetic base surface of the first cavity by magnetic pull force if it accidentally tilts into the second cavity.

In an embodiment the headphones are characterized in that the first cavity has a circular base surface, the second cavity is defined on a circular segment of this circular base surface and forms an inclined plane with a constant angle with respect to the circular base surface of the first cavity.

In an embodiment, the headphones are characterized in that the headphones are configured to record a file history of the file played, the file played (specifically, for example, the name of the file and/or the path where the file is stored), the distinctive identification of the NFC tag, and a time stamp.

In an embodiment, the headphones are characterized in that playback of the audio file continues seamlessly when the NFC tag is again brought into the immediate vicinity of the NFC reader after playback has ended.

In an embodiment, the headphones are characterized in that the headphones furthermore comprise an infrared sensor configured to detect whether the device is being worn by a person.

In an embodiment, the headphones are characterized in that the audio file is played automatically only if the infrared sensor detects that the headphones are being worn by a person.

In an embodiment, the headphones are characterized in that the headphones are cup headphones. In an embodiment, the headphones are characterized in that the NFC reader is attached to the right headphone cup of the headphones and the magnetic surface is applied to the right headphone cup of the headphones. In an embodiment, the headphones are characterized in that the headphones have a corrugation on the headphone cups.

In an embodiment, the one or more audio files are incomplete audio files. An incomplete audio file of the one or more audio files can only be completed by data read out via the NFC reader, and audio content can be played only after the incomplete audio file has been completed. This provides protection against unauthorized access to the audio content.

The chip according to the invention, in particular made of plastic, with an embedded NFC tag is configured to transmit an RFID code containing a distinctive identification of the NFC tag to an NFC reader when the chip is brought into the immediate vicinity of the NFC reader.

In an embodiment, the chip is characterized in that the NFC tag has a substantially radially symmetrical, in particular a ring-shaped, geometry.

In a further embodiment, the chip is characterized in that a magnetized or magnetizable component is embedded into the chip such that the chip can be attached to a surface by magnetic pull force.

In an embodiment, the chip is characterized in that the chip has at least one planar surface such that the chip can be attached magnetically to a planar magnetic surface in that one of the at least one planar surface of the chip and the planar magnetic surface are made to substantially contact. In an embodiment, the chip is characterized in that the housing of the chip has substantially radial symmetry and the NFC tag is embedded centrally in the chip and is oriented parallel to one of the at least one planar surface of the chip.

In an embodiment, the chip is characterized in that the chip has a substantially plano-convex geometry, i.e. a planar surface and a convex surface.

In an alternative embodiment, the chip is characterized in that the chip has a substantially cylindrical geometry.

In an embodiment, the chip is characterized in that the magnetized or magnetizable component is embedded in the chip in a ring-shaped manner, where the magnetized or magnetizable component is oriented parallel to one of the at least one planar surface of the chip.

In an embodiment, the chip is characterized in that, following the embedding of one or more components, the two halves of the chip are welded together by ultrasonic welding.

In an embodiment, the chip is characterized in that the NFC tag is a passive tag.

In an embodiment, the chip is characterized in that the chip has a substantially cylindrical geometry with a diameter large enough that children cannot swallow the chip and a height large enough that an NFC tag can be embedded. In an embodiment, the chip is characterized in that the chip has a diameter of between 40 millimeters and 55 millimeters and has a height of between 3 millimeters and 10 millimeters.

In an embodiment, the chip is characterized in that the chip has an indentation on at least one side for attaching a labelling sticker.

In an embodiment, the chip is characterized in that, when brought into the immediate vicinity of the NFC reader, the chip is configured to transmit an RFID code corresponding to the orientation to the NFC reader, depending on the orientation of the chip with respect to the NFC reader.

In an embodiment, the chip is characterized in that a part of an audio file is stored on the chip, where the chip is configured to transmit the part of the audio file to an NFC reader when the chip is brought into the immediate vicinity of the NFC reader. The part of the audio file can be encrypted. Alternatively or additionally, the chip can be configured to transmit the part of the audio file to the NFC reader in encrypted form. Audio content associated with the part of the audio file can be played only based on the supplementation of the part of the audio file by way of a complementary audio file. This allows the audio files to be protected from unauthorized access.

In embodiments, the part of the audio file is stored on flash memory. The flash memory can be completely encased with a material. The material comprises a plastic or a plant-based material. By completely encasing the flash memory, unauthorized access to the flash memory can be prevented, since any attempt to access the flash memory would lead to the destruction of the encasing and/or the chip.

In an embodiment, an audio output system according to the invention for playing audio content comprises a chip that comprises an NFC tag. The NFC tag is associated with a distinctive identification. A first partial file is also stored on the chip. Furthermore, the audio output system comprises an audio output device. The audio output device comprises: a memory configured to store one or more second partial files and an NFC reader. Each of the one or more second partial files is associated with a distinctive identification. The audio output device is configured to: read the chip's distinctive identification; receive the first partial file from the chip; determine a second partial file of the one or more second partial files based on the distinctive identification read out;

and automatically play audio content resulting from a combination of the first partial file from the chip and the determined second partial file of the one or more second partial files when the NFC tag is brought into immediate vicinity of the NFC reader. The first partial file can be part of an audio file or be converted into an audio file. The one or more second partial files can each be part of an audio file or converted into an audio file.

In embodiments, the audio content associated with the second partial file is locked and can be played only by combining or joining the first partial file and the second partial file determined. The first partial file can be stored on the chip in encrypted form. Alternatively or additionally, the first partial file can be transmitted to the NFC reader in encrypted form. The audio output device can be configured to decrypt the first partial file based on the distinctive identification of the chip read out and/or the second partial file determined.

In embodiments, the one or more second partial files stored on the memory can be encrypted. The audio output device can be configured to decrypt the determined second partial file based on the distinctive identification of the chip read out and/or the first partial file received. The audio output device can be headphones, in particular cup headphones.

By dividing the audio file into two partial files, the audio file can be protected from unauthorized access. By encrypting the partial files, access to the audio file by unauthorized persons can be prevented.

The present object of the invention shall be described in more detail below using exemplary drawings. Examples of advantageous configurations of the invention are shown in the drawings, where.

Figure 1:
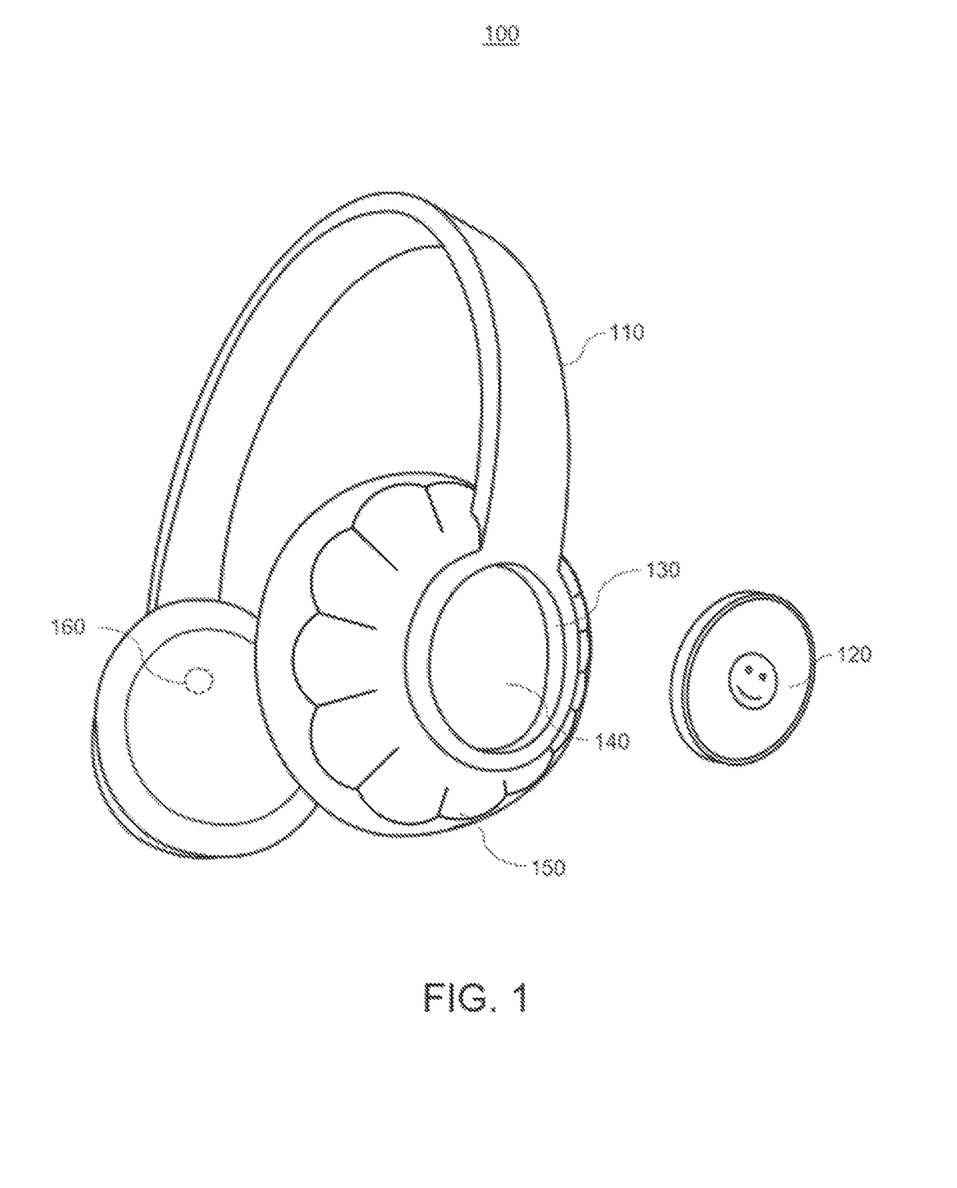
FIG. 1 shows a schematic representation of an interactive headphone system according to the invention for storing and playing audio content according to one embodiment.

FIG. 1 shows an interactive headphone system 100 according to the invention for storing and playing audio content. Interactive headphone system 100 comprises headphones 110 and an NFC tag. The NFC tag with an RFID code containing a distinctive identification for the NFC tag can be embedded in a chip, in particular a plastic chip 120. It goes without saying that a chip is a flat component with an otherwise arbitrary housing shape. The chip shall be described hereafter as a preferred embodiment in the form of a plastic chip 120. It is to be noted that the chip represents in particular the functionality of a housing into which one or more components can be embedded, and in addition to the preferred embodiment made of plastic, can be constructed in alternative embodiments of any other material ensuring sufficient stability and suitable for the implementation of the functionality claimed herein, such as hard paper, ceramics, wood, bioplastics or comparable stable material that is biodegradable and/or made from renewable raw materials. Headphones 110 can comprise a cavity 130 with a magnetic surface 140 forming a base surface of cavity 130. Headphones 110 comprises a memory, not shown in more detail (shown schematically in FIG. 4), that stores one or more audio files, where each of the one or more audio files is associated with a distinctive identification, and where access to the one or more audio files is locked such that access is possible only by an RFID code containing a distinctive identification corresponding to the distinctive identification of a respective audio file. The memory can have a memory space, for example, of 10 gigabytes, 20 gigabytes or 50 gigabytes and can be implemented, for example, by a magnetic, optical, or semiconductor-based storage medium. More specifically, the memory can be present, for example, in the form of a solid-state drive.

Figure 4:
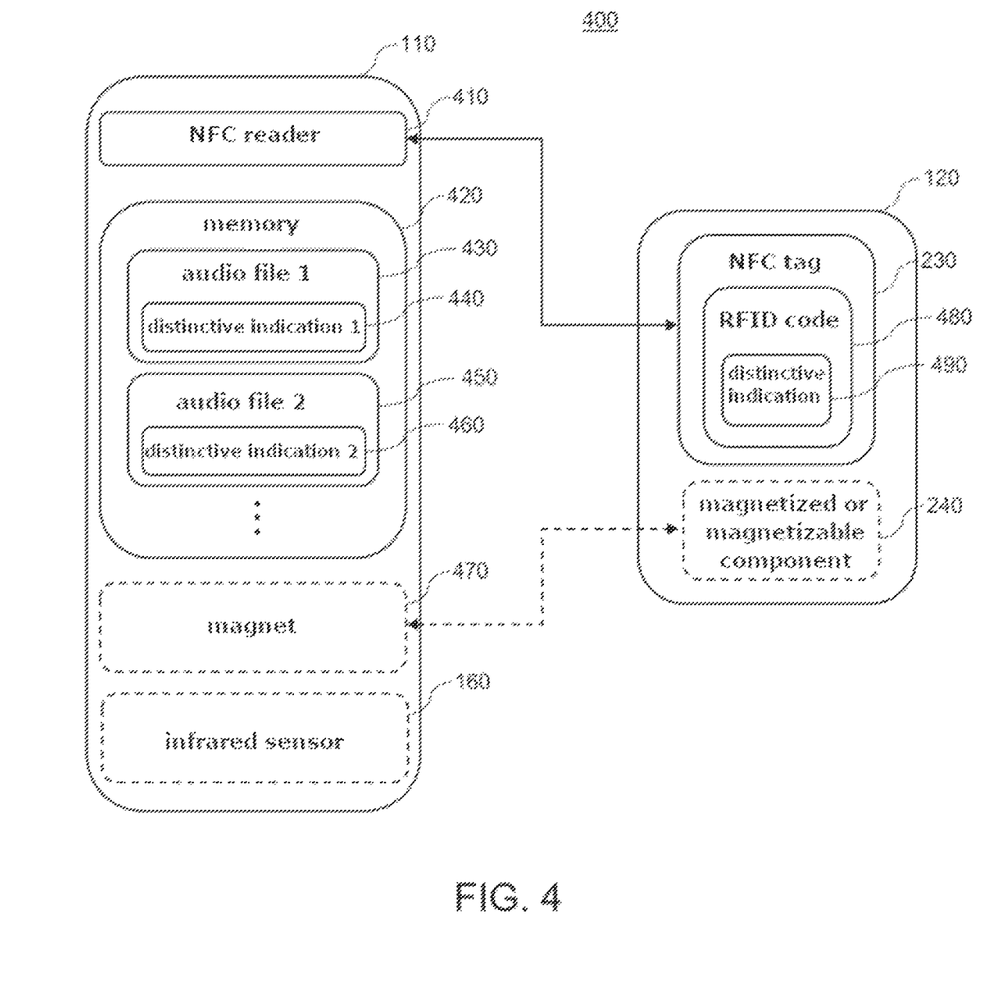
FIG. 4 shows a schematic representation of an interactive headphone system according to the invention for storing and playing audio content according to one embodiment.

Headphones 110 furthermore contains an NFC reader which is not shown in more detail (shown schematically in FIG. 4). When an NFC tag with a distinctive identification corresponding to the distinctive identification of a respective audio file stored on the memory of the headphones is brought into the immediate vicinity of the NFC reader, headphones 110 are configured to process the RFID code containing the distinctive identification of the NFC tag; correlate the distinctive identification of the NFC tag with the distinctive identification of the audio file stored on the memory; unlock the audio file; and start playing the audio file automatically. Playback can be ended automatically when the NFC tag is removed from the immediate vicinity of the NFC reader. Ending playback can mean stopping playback or temporarily interrupting playback. According to one embodiment, playback can continue seamlessly when the NFC tag is brought back into the immediate vicinity of the NFC reader after an interrupted playback.

Furthermore, headphones 110 contain respective circuitry so that headphone system 100 can have and implement the features described and claimed herein.

Headphones 110 can also comprise a magnet, in particular a magnetic surface 140, in the immediate vicinity of the NFC reader. For example, the NFC reader can be attached directly below magnetic surface 140 so that plastic chip 120 with an embedded NFC tag can be attached magnetically to headphones 110 for unlocking and playing audio content in the event that plastic chip 120 is configured such that magnetic surface 140 of the headphone exerts a magnetic pull force upon plastic chip 120. In such a configuration, the audio file stored on the memory, whose distinctive identification corresponds to the distinctive identification of the NFC tag embedded in plastic chip 120, can be played until plastic chip 120 is removed from magnetic surface 140 and/or the rechargeable battery of the headphones is empty and/or the unlocked audio file has been played completely. Magnetic surface 140 can be, for example, the surface of a magnet. In another configuration, magnetic surface 140 can also be a plastic surface under which a magnet is embedded, where the plastic surface and the underlying magnet are configured and/or dimensioned in such a way that the magnet exerts a magnetic pull force upon magnetizable or magnetized objects that is large enough for them to adhere to magnetic surface 140. As a concrete example, magnetic surface 140 can be configured such that plastic chip 120 with the embedded NFC tag is configured to be attracted to magnetic surface 140 by magnetic pull force, to experience a magnetic pull force large enough to affix adhering plastic chip 120 to headphones 110 for any spatial orientation of headphones 110 and for normal accelerations of headphones 110 (e.g. by a running motion, jumping, head motion, etc.).

Headphones 110 can record a file history of the file played, the file played (specifically, for example, the name of the file and/or the path where the file is stored), the distinctive identification of the NFC tag, and/or the distinctive identification of the file being played, and a timestamp. If the playback is temporarily interrupted, for example, by removing plastic chip 120 from magnetic surface 140, by removing headphones 110, and/or by switching off headphones 110, in such a configuration the playback of the audio file can be continued seamlessly after the playback has ended when headphones 110 are switched on and the NFC tag is brought back into the immediate vicinity of the NFC reader, or plastic chip 120 with the embedded NFC tag in some configurations is attached magnetically to headphones 110.

Headphones 110 can furthermore contain technology for suppressing unwanted ambient noise, this can comprise active noise canceling and/or passive noise canceling, for example, based on the geometry and material selection (for example, sound-absorbing foam) of the components installed. The ambient sound level pressure can be reduced by appropriate sound suppression, for example, by 20 dB(A), by 25 dB(A) or by 30 dB(A).

Furthermore, headphones 110 can comprise one or more control elements (e.g., one or more of: a push button, pressure key, rocker switch, toggle switch and lever, rotary knob and switch, slider, slide switch) for controlling headphones 110. For example, pressing a button once can cause headphones 110 to skip a passage or song, whereas repeatedly pressing the button can cause headphones 110 to skip back to the last passage or song. Furthermore, headphones 110 can comprise, for example, one or more control elements for adjusting the volume. As a specific example, headphones 110 can comprise a toggle switch for selecting among three playback volumes, for example, of 65 dB(A), 75 dB(A), and 85 dB(A).

In some configurations, headphones 110 are cup headphones. In this configuration, for example, the NFC reader can be attached to the right headphone cup. Furthermore, headphones 110 in the configuration as cup headphones can comprise a headband that is adjustable in size so that headphones 110 can be adjusted to suit people with different head sizes. For example, in such a configuration, headphones 110 can be configured to be adjustable in size specifically for children between the ages of three and ten years. Furthermore, headphones 110 in a configuration as cup headphones can comprise joints that allow each headphone cup to rotate about two axes (for example, about an x-axis and a y-axis) for increased wearing comfort. Headphones 110 can also comprise a corrugation 150 on the headphone cups that allows for improved handling of headphones 110, in particular for children, and specifically facilitate the insertion/removal of plastic chip 120 due to improved ergonomics.

Furthermore, headphones 110 can comprise an indicator light that lights up, for example, solid green when headphones 110 are powered on, lights up solid blue when headphones 110 are processing data, has an active connection, or is in pairing mode, and lights up solid red when the rechargeable battery of headphones 110 is almost empty. As a specific example, the indicator light can light up red when 40 minutes or less of rechargeable battery life remain for normal operation. For example, headphones 110 can provide a visual and/or audible indication every 10 minutes when 40 minutes or less of rechargeable battery life remain for normal operation. As a supplementary example, headphones 110 can provide a visual and/or audible indication every 2 minutes when 10 minutes or less of rechargeable battery life remain for normal operation. The rechargeable battery can be configured in such a way that it has a rechargeable battery life of 10 hours, 12 hours, or 14 hours in normal playing operation and can be recharged within a short period of time, for example, in a fast-charging process.

Headphones 110 can comprise an infrared sensor 160. Infrared sensor 160 is configured to detect whether headphones 110 are being worn by a person. When the NFC tag in one configuration with a distinctive identification corresponding to the distinctive identification of an audio file stored on the memory of headphones 110 is brought into the immediate vicinity of the NFC reader, playback of the audio file can start automatically only when infrared sensor 160 detects that headphones 110 are being worn by a person. Furthermore, in such an embodiment, an ongoing playback can be interrupted if infrared sensor 160 detects that headphones 110 has been taken off/are no longer being worn by a person. In one configuration as cup headphones, infrared sensor 160 can be attached to a headphone cup of headphones 110 in a preferred embodiment, as shown in FIG. 1 by way of example. In an alternative configuration, infrared sensor 160 can be attached to the headband of headphones 110.

Headphones 110 can further comprise one or more physical connections, such as one or more of a USB-C connection and/or a USB-B connection. In such a configuration, firstly, the battery of headphones 110 can be charged via the one or more physical connections, and secondly, a respective connection can also be used for data transmission and for establishing a connection to a mobile phone, smartphone, tablet, or computer. After establishing a connection to a mobile phone, smartphone, tablet or computer, an application or website can be retrieved, via which data from headphones 110 can be uploaded to a platform (for example a cloud, a server, etc.) and data can be downloaded to headphones 110 in such a configuration via the mobile phone, smartphone, tablet or computer. In this configuration, the exchange of data with, for example, a server can take place with a router via a WIFI connection of the smartphone, tablet, or computer connected to headphones 110.

Uploaded data can comprise, for example, the distinctive identification of an NFC tag that has unlocked audio content stored on headphones 110 and caused headphones 110 to play the audio content. Furthermore, such an NFC tag can be registered in a central directory. In particular, an NFC tag can also be registered which was brought into the immediate vicinity of the NFC reader of headphones 110 for unlocking and playing audio content stored on headphones 110 and whose distinctive identification has been classified as qualified for unlocking audio content, but for which a corresponding audio content is not stored on the headphones, for example, the audio content is damaged and therefore could not be played, and/or the audio content could not be read out.

Downloaded data can comprise, for example, an update, modification, and/or download of audio files stored/to be stored on headphones 110. Furthermore, specifically audio files for which there was previously a failed attempt to unlock and playback using a corresponding NFC tag can be loaded onto headphones 110. As another example, new audio content that is popular with other users can be loaded onto the headphones.

Furthermore, headphones 110 can be collapsed or folded flat so that they can be stowed away and transported in a space-saving manner. Headphones 110 can be configured such that the individual parts do not feel sharp-edged to the user, for example, by rounding the edges with a radius of at least one millimeter. Additionally, the joints and moving components of headphones 110 can be configured to move in a frictionless manner with slight resistance. Furthermore, the materials of headphones 110 can be chosen to be durable and resistant to wear and tear. Furthermore, headphones 110 can be configured such that the weight is evenly distributed on both sides of headphones 110.

In particular, Interactive headphone system 100 provides technology that is particularly suited for use by children. The simple configuration of headphones 110 as well as plastic chip 120 with embedded plastic chip 230, and in particular the intuitive interaction of these system components in the operation of the system, makes it possible for children in particular to use the interactive headphone system 100 in a playful and easy manner and to listen to audio content independently and without the help of, for example, the parents, older siblings, or a chaperone for playing it.

Figure 2:
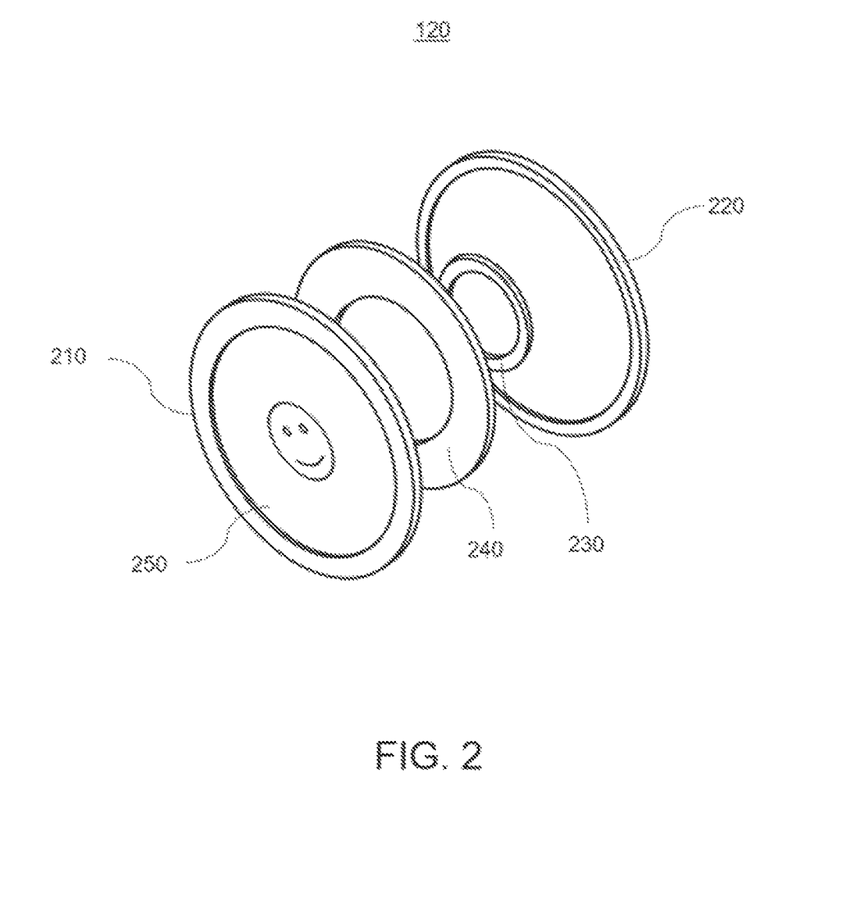
FIG. 2 shows a schematic representation of a device according to the invention for transmitting an RFID code contained in an NFC tag to an NFC reader according to one embodiment.

FIG. 2 shows a schematic representation of a device according to the invention for transmitting an RFID code contained in an NFC tag to an NFC reader according to one embodiment, in particular an exploded view of plastic chip 120 from FIG. 1. In addition to the actual housing, which is constructed in a configuration made of two halves of plastic chip 210 and 220, plastic chip 120 comprises an NFC tag 230. NFC tag 230 is programmed with a distinctive identification and contains an RFID code containing this distinctive identification. Plastic chip 120 with embedded NFC tag 230 is configured to transmit the RFID code contained in NFC tag 230 to an NFC reader, for example, to the NFC reader contained in headphones 110, when plastic chip 120 is brought into the immediate vicinity of the NFC reader. In this context, immediate vicinity means at least a distance between NFC tag 230 and the NFC reader that ensures stable and reliable data transmission by near field communication. It is therefore understood that the term immediate vicinity in the context of NFC technology means a distance in any case of no more than 10 cm between NFC tag 230 and the NFC reader. Apart from this maximum distance intrinsically given by the technology, the combination of NFC tag 230 and the NFC reader can be configured at random. Correspondingly, immediate vicinity can mean, for example, 0.5 cm, 1 cm, 2 cm, or 5 cm between NFC tag 230 and the NFC reader, depending on the embodiment.

NFC tag 230 can have a substantially radially symmetrical, in particular a ring-shaped, geometry. Such a configuration is shown in FIG. 2. A substantially radially symmetrical geometry means that radial symmetry is generally given, but it can be disturbed, for example, due to production, by small, non-radially symmetrical indentations, or also, for example, by non-radially symmetrical electrical connections. With the substantially radially symmetrical geometry, the focus is on the fact that the transmission of the RFID code contained in NFC tag 230 to an NFC reader can be ensured to be rotationally invariant with respect to the axis of symmetry. The same applies to the substantially ring-shaped geometry that represents a preferred configuration of NFC tag 230.

Furthermore, a magnetized or magnetizable component 240 can be embedded in plastic chip 120 so that plastic chip 120 can be attached by magnetic pull force to a surface, for example, magnetic surface 140 from FIG. 1, a component, or a recess.

Magnetized or magnetizable component 240 can have a substantially radially symmetrical, in particular a ring-shaped, geometry. Such a configuration is shown in FIG. 2. A substantially radially symmetrical geometry means that radial symmetry is generally given, but it can be disturbed, for example, due to production, by small, non-radially symmetrical indentations. With the substantially radially symmetrical geometry, the focus is on the fact that the magnetic attachment of plastic chip 120 to a magnetic surface, for example, magnetic surface 140 from FIG. 1, can be ensured to be rotationally invariant with respect to the axis of symmetry. The same applies to the substantially ring-shaped geometry that represents a preferred configuration of magnetized or magnetizable component 240. Magnetized or magnetizable component 240 can be manufactured, for example, from iron, steel, or any other magnetized or magnetizable material.

Plastic chip 120 can have at least one planar surface so that plastic chip 120 can be attached magnetically to a planar magnetic surface, for example, magnetic surface 140, in that one of the at least one planar surface of plastic chip 120 can be made to substantially contact the planar magnetic surface. Made to substantially contact means that one of the at least one planar surface of plastic chip 120 and the planar magnetic surface are approached to at least a distance at which the magnetic pull force is sufficient to magnetically affix plastic chip 120 to the magnetic surface. As a concrete example, the strength of the magnetic pull force in the affixed state can be configured such that plastic chip 120 with the embedded NFC tag, which is configured to be pulled toward magnetic surface 140 by magnetic pull force, experiences a magnetic pull force large enough to affix adhering plastic chip 120 to headphones 110 for any spatial orientation of headphones 110 and for normal accelerations of headphones 110 (e.g. by a running motion, jumping, head motion, etc.).

The housing of plastic chip 120 can have a substantially a radial symmetry. Substantially a radially symmetry means that radial symmetry is generally given, but it can be disturbed, for example, due to production, by small, non-radially symmetrical indentations. Furthermore, it is to be noted that the radial symmetry of the housing of plastic chip 120 is confined to the external geometry of plastic chip 120, i.e. plastic chip 120 has a substantially radially symmetrical geometry on the exterior. This geometry enables plastic chip 120 to be inserted in a rotationally invariant manner, for example, into cavity 130 of headphones 110 from FIG. 1. NFC tag 230 can be embedded centrally into plastic chip 120. For example, NFC tag 230 as well as the housing of plastic chip 120 can have substantially radial symmetry, where NFC tag 230 is embedded in plastic chip 120 in such a way that the axes of symmetry of NFC tag 230 and the housing of plastic chip 120 coincide. Furthermore, magnetized or magnetizable component 240 can be centrally embedded in plastic chip 120. For example, NFC tag 230, the housing of plastic chip 120, and magnetized or magnetizable component 240 can have substantially radial symmetry, where NFC tag 230 and magnetized or magnetizable component 240 are embedded in plastic chip 120 in such a way that the axes of symmetry of NFC tag 230, magnetized or magnetizable component 240 and the housing of plastic chip 120 coincide. Such a configuration is illustrated in the exploded view of plastic chip 120 in FIG. 2. In such an embodiment, NFC tag 230 and magnetized or magnetizable component 240 are therefore aligned parallel to one of the at least one planar surface of plastic chip 120.

Plastic chip 120 can have a substantially plano-convex geometry. This means that plastic chip 120 has a planar surface and a convex surface. In this context, a substantially plano-convex geometry means that minor, for example production-related deviations from a purely plano-convex geometry, as is the case with, for example, a plano-convex lens, do not significantly impair the plano-convex character, especially in a functional way. In such a configuration, for example, the planar surface of plastic chip 120 can be affixed to headphones 110 due to the magnetic pull force which is caused by magnetized or magnetizable component 240 interacting with magnetic surface 140, while the oppositely disposed convex surface of plastic chip 120 follows the geometry of the headphone cup.

Alternatively, plastic chip 120 can have a substantially cylindrical geometry. In this context, a substantially cylindrical geometry means that the outer appearance of plastic chip 120 has a cylindrical geometry, where smaller, for example, production-related deviations from a purely cylindrical geometry represent no restriction. In addition to a rotationally invariant insertion of plastic chip 120 into, for example, cavity 130 of headphones 110 from FIG. 1, this geometry instead furthermore allows for the option of bringing any one of the two planar surfaces of plastic chip 120 substantially into contact with, for example, magnetic surface 140 from FIG. 1.

Plastic chip 120 can have a structure made of two individual halves 210 and 220. This allows for easy embedding of components, such as NFC tag 230 and magnetized or magnetizable component 240. The two halves of plastic chip 210 and 220 can be welded together by ultrasonic welding following the embedding of components and then form plastic chip 120 as a closed component.

NFC tag 230 can be, for example, a passive tag so that active-passive communication can take place between an NFC reader, for example, the NFC reader of headphones 110, and NFC tag 230. For example, the NFC reader of headphones 110 can emit an electromagnetic field, where the energy transmitted is absorbed by NFC tag 230 and NFC tag 230 is thus able to implement the commands received. Continuing this example, in the case of reading out NFC tag 230, the electromagnetic field of the NFC reader can be attenuated or the modulated signal can be reflected inversely phased, as a result of which the NFC reader can view the information stored.

Plastic chip 120 can be sized to have a generally cylindrical geometry and a diameter large enough that children cannot swallow plastic chip 120 and furthermore a height large enough that an NFC tag can be embedded. A diameter of plastic chip 120 large enough that children cannot swallow plastic chip 120 minimizes the risk of choking for children by swallowing plastic chip 120. In addition to a height of plastic chip 120 large enough that an NFC tag can be embedded, other factors can influence the height configuration of plastic chip 120. For example, the height can be chosen large enough to additionally be able to embed the magnetized or magnetizable component 240 and/or to be able to embed any other components in addition to NFC tag 230. Furthermore, the height of plastic chip 120 can be chosen such that plastic chip 120 meets a criterion for a flexural strength which prevents breakage or plastic deformation of the component. As a specific example, plastic chip 120 can have a diameter of between 40 millimeters and 55 millimeters and a height of between 3 millimeters and 10 millimeters.

Plastic chip 120 can have an indentation 250 on one side for attaching a labelling sticker. In such a configuration, the labelling sticker can indicate which audio content can be unlocked for playback with respective plastic chip 120 with embedded NFC tag 230. Depression 250 can have any geometry, for example, be cylindrical, having a depth of, for example, 0.5 millimeters, 0.8 millimeters or 1.0 millimeters and a diameter which is arbitrarily large, but at least smaller than the diameter of plastic chip 120.

The plastic chip can be configured such that, when brought into immediate vicinity of the NFC reader, it transmits an RFID code corresponding to the orientation to the NFC reader, depending on the orientation of the plastic chip with respect to the NFC reader. This allows different audio content to be unlocked for automatic playback, depending on the orientation of the plastic chip with respect to the NFC reader. Accordingly, the cylindrical plastic chip 120 in one embodiment can be attached by way of example magnetically to headphones 110 in that a first planar surface of plastic chip 120 and the planar magnetic surface of the headphones are made to substantially contact for unlocking audio content stored on the headphones by transmitting a corresponding first RFID code and to play it automatically. Continuing this example, the plastic chip by way of example can be turned over after successful playback of the first audio content, the second planar surface of plastic chip 120 and the planar magnetic surface of the headphones can then be made to substantially contact and second audio content can be released for automatic playback by transmitting a corresponding second RFID code. Similarly to records and audio cassettes, the plastic chip in this embodiment in a correspondingly functional manner has an A side and a B side, or a front and reverse side.

For the sake of completeness, it is be noted that plastic chip 120 in an alternative configuration, when brought into the immediate vicinity of the NFC reader, can transmit an RFID code to an NFC reader regardless of its orientation with respect to the NFC reader. For example, the cylindrical plastic chip in one embodiment can be attached magnetically to headphones 110 in that a first planar surface of plastic chip 120 and the planar magnetic surface of the headphones are made to substantially contact for unlocking audio content stored on the headphones and to play it automatically. It is irrelevant in this configuration which of the two planar surfaces of plastic chip 120 is made to substantially contact the planar magnetic surface of the headphone, since the plastic chip can unlock the same audio content for playback regardless of the side facing headphones 110.

In an embodiment, the plastic chip is characterized in that, when the plastic chip is brought into the immediate vicinity of the NFC reader, the chip is configured to transmit a second RFID to the NFC reader, depending on the orientation of the chip with respect to the NFC reader.

Figure 3A:
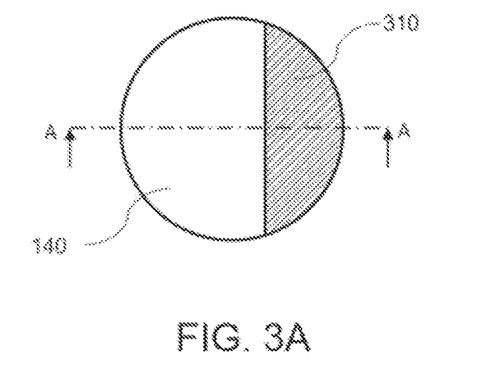
FIGS. 3A to 3D show a schematic representation of a cavity of the headphones according to one embodiment.

FIGS. 3A to 3D show a schematic representation of a cavity 130 of headphones 110 according to the invention. FIG. 3A shows a schematic top view of cavity 130 according to FIG. 1. Planar magnetic surface 140 of headphones 110 can form the base surface of a first cavity, the first cavity can be cavity 130 in this example. In addition, the first cavity can have a geometry that is suitable for affixing plastic chip 120 in the lateral direction. FIG. 3A shows, for example, a circular base surface of cavity 130 which is suitable for laterally affixing, for example, a cylindrical plastic chip having a suitable diameter. Continuing this example, the diameter of cavity 130 can be, for example, 1 millimeter, 2 millimeters, or 3 millimeters larger than the outer diameter of plastic chip 120.

Furthermore, a second cavity 310 can be defined on a part of the base surface of the first cavity. This enables a mechanism that allows for a magnetically attached plastic chip 120 to be tilted into second cavity 310 by applying pressure upon part of plastic chip 120 in a top view overlapping second cavity 310 and can thereby be ergonomically removed from headphones 110.

The surface of second cavity 310 can be configured to be non-magnetic so that a plastic chip 120 attached magnetically to magnetic surface 140 of the first cavity, in the event of an unintentional tilting into second cavity 310, is pulled back by magnetic pull force to magnetic surface 140 of the first cavity. This configuration advantageously avoids the unintentional loss of plastic chip 120 with embedded NFC tag 230 by preventing an unstable, tilted, and therefore non-aligned arrangement of the system components, which would be susceptible to a contact resolving the magnetic engagement. Unintentional tilting of plastic chip 120 can be caused, for example, by a jerky motion or by inadvertently applying pressure to part of plastic chip 120 in the top view overlapping second cavity 310.

For example, the first cavity can have a circular base surface, whereas second cavity 310 is defined on a circular segment of this circular base and forms an inclined plane with a constant angle with respect to the circular base surface of the first cavity. This particular embodiment is shown in FIG. 3A. The segment height of the circular segment can be chosen arbitrarily, for example 25%, 35%, or 50% of the diameter of the first cavity. The constant angle can also be chosen arbitrarily, for example, 10 degrees, 25 degrees, or 40 degrees with respect to the planar base surface of the first cavity.

Figure 3B:
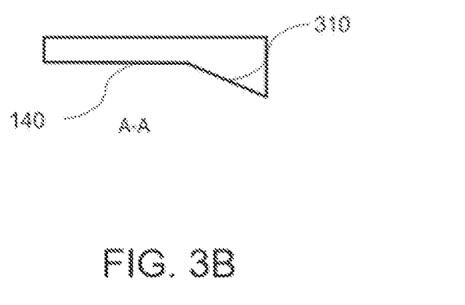

FIG. 3B shows a lateral view of the schematic representation of a cavity 130 of headphones 110 according to the invention and illustrates magnetic surface 140 of the first cavity and furthermore second cavity 310 which in the embodiment shown represents a planar surface with a constant angle with respect to magnetic surface 140 of the first cavity.

Figure 3C:
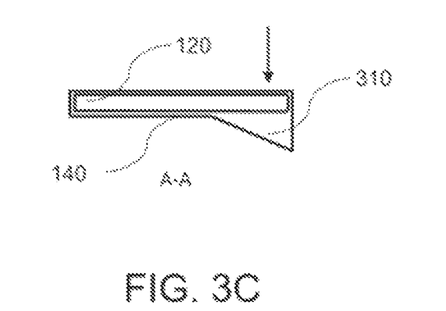
Figure 3D:
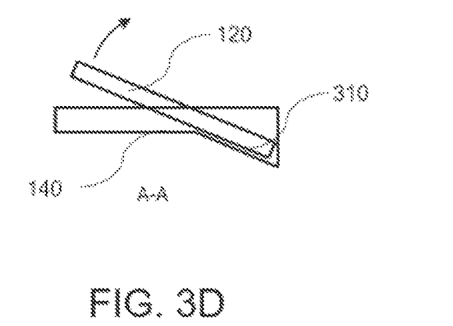

FIGS. 3C and 3D show the lateral view of the schematic representation of a cavity 130 of headphones 110 according to the invention in combination with an inserted plastic chip 120 in two different positions. FIG. 3C shows plastic chip 120, which is substantially in contact with magnetic surface 140 of the first cavity and is pulled toward magnetic surface 140 due to the magnetic pull force. Part of the plastic chip overlaps second cavity 310 so that there is a hollow space under this part of the plastic chip. When pressure is now exerted upon plastic chip 120 upon this part of the plastic chip (illustrated by the arrow in FIG. 3C), then the latter can tilt into second cavity 310 and thus be brought to the position shown in FIG. 3D.

From the position shown in FIG. 3D, plastic chip 120 can be removed ergonomically from cavity 130 (illustrated by the arrow in FIG. 3D). However, if plastic chip 120 is not removed in this position, it can also be automatically pulled back to magnetic base surface 140 in the event that the base surface of second cavity 310 is not magnetic.

FIG. 4 shows a schematic representation 400 of an interactive headphone system according to the invention for storing and playing audio content according to one embodiment. The structure of headphones 110 and plastic chip 120 is shown schematically. As already introduced above, headphones 110 comprises NFC reader 410 and memory 420. Stored in memory 420 are one or more audio files, for example, audio file 1 430 and audio file 2 450. Each audio file is associated with a distinctive identification, for example, distinctive identification 1 440 for audio file 1 430 and distinctive identification 2 460 for audio file 2 450. Any number of other audio files with associated distinctive identifications can be stored in memory 420 of headphones 110. Access to the audio files stored on memory 420 is locked. Headphones 110 can furthermore comprise a magnet 470, in particular magnetic surface 140, as already introduced above. Furthermore, headphones 110 can comprise infrared sensor 160, as introduced above.

Plastic chip 120 comprises RFID code 480 and distinctive identification 490 associated with NFC tag 230. Plastic chip 120 can furthermore comprise a magnetized or magnetizable component 240, as already introduced above.

When NFC tag 230 is brought into the immediate vicinity of NFC reader 410 of headphones 110 (illustrated by the solid arrow in FIG. 4), the headphones are configured to read out RFID code 480 contained on NFC tag 230, to determine distinctive identification 490 from RFID code 480, to compare distinctive identification 490 with distinctive identifications 440 and 460 of audio files 430 and 450 stored in memory 420, to unlock a corresponding audio file in the event that distinctive identification 490 matches a distinctive identification 440, 460 of a stored audio file 430, 450, and to start playing corresponding audio file. For example, NFC reader 410 can determine that distinctive identification 490 does not match distinctive identification 1 440, but that distinctive identification 490 does match distinctive identification 2 460, and in response to this determination, headphones 110 can unlock audio file 2 450 and start playing audio file 2 450 automatically.

As already introduced above, a magnetic pull force (illustrated by the dashed arrow in FIG. 4) between headphones 110 and plastic chip 120 can be ensured, firstly, by magnet 470, in particular magnetic surface 140, and, secondly, magnetized or magnetizable component 240, when plastic chip 120 is brought into the immediate vicinity of headphones 110.

Furthermore, as already introduced above, infrared sensor 160 can be configured to detect whether headphones 110 are being worn by a person. In one configuration, when NFC tag 230 is brought into the immediate vicinity of NFC reader 410, playback of the audio file can start automatically only if infrared sensor 160 detects that headphones 110 are being worn by a person. Furthermore, in such a configuration, an ongoing playback can be interrupted if infrared sensor 160 detects that headphones 110 have been taken off/are no longer being worn by a person.

Figure 5:
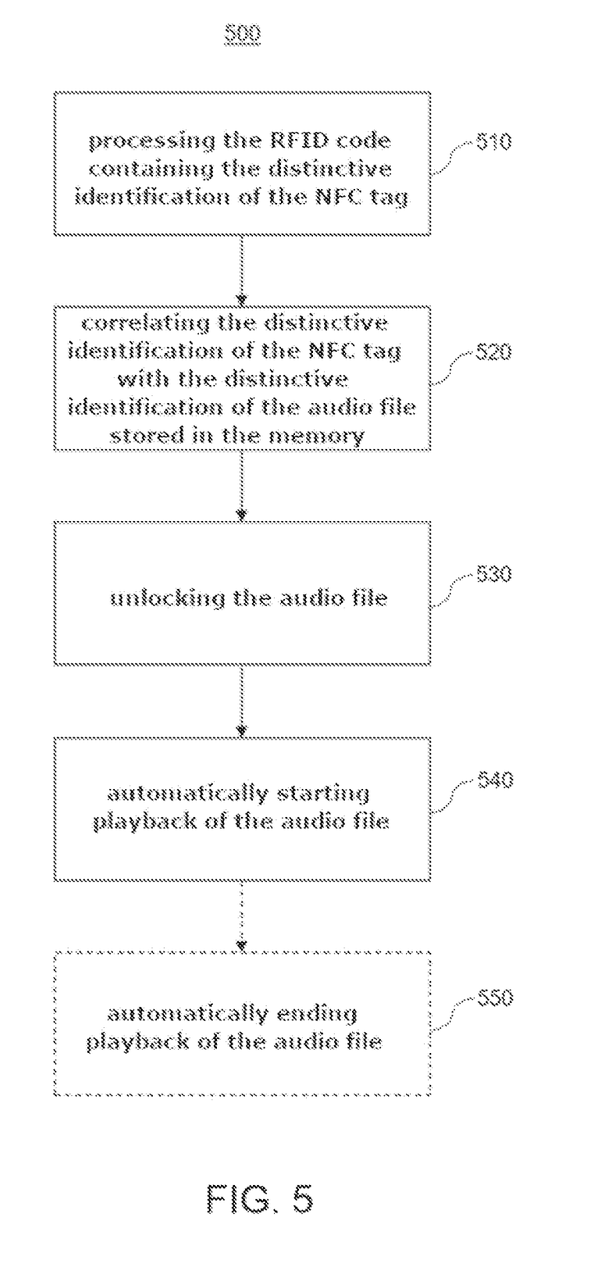
FIG. 5 shows a schematic flow chart of a method according to an embodiment of the interactive headphone system according to the invention.

FIG. 5 shows a schematic flow chart 500 of an embodiment of the interactive headphone system according to the invention. Flow chart 500 is executed by interactive headphone system 100, in particular by headphones 110, when NFC tag 230 with a distinctive identification 490 corresponding to distinctive identification 440, 460 of an audio file 430, 450 stored in memory 420 is brought into the immediate vicinity of NFC reader 410. Flowchart 500 starts with step 510, processing RFID code 480 containing the distinctive identification of NFC tag 490 corresponding to the distinctive identification of the audio file. In the next step 520, distinctive identification 490 of NFC tag 230 is correlated with the distinctive identification of the audio file stored in memory 420. This audio file is first unlocked in step 530. Step 540 comprises automatically starting playback of the audio file. Step 550, which comprises automatically ending playback of the audio file, follows optionally.

What is claimed is:
1. A headphone system, comprising:
   a near field communication (NFC) tag with a radio frequency identification (RFID) code including a first identifier of the NFC tag;
   a headphone, comprising:
   a memory to store one or more audio files, wherein each of the one or more audio files are associated with a second identifier, and wherein access to the one or more audio files is locked, such that access is only possible by an RFID code containing the first identifier corresponding to the second identifier of a respective audio file; and an NFC reader, wherein, when the NFC tag including the first identifier corresponding to the second identifier of the respective audio file is brought within communication range of the NFC reader, the headphone is to:
process the RFID code including the first identifier of the NFC tag;
correlate the first identifier of the NFC tag with the second identifier of the audio file stored in the memory;
unlock the audio file; and
automatically start playback of the audio file,
wherein the headphone system further comprises at least one of:
the playback is to automatically stop when the NFC tag is removed from the communication range of the NFC reader;
the NFC tag is embedded in a chip that includes plastic;
the audio file played, the first identifier of the NFC tag, and a time stamp are recorded so that after an end of an ongoing playback, the playback of the audio file is continued seamlessly when the NFC tag is again brought within communication range of the NFC reader; and
the headphone comprises an infrared sensor to detect whether the headphone is worn by a person and the automatic playback of the audio file takes place only if the infrared sensor detects that the headphone is being worn by the person.

2. The headphone system according to claim 1, wherein the headphone comprises a magnet including a magnetic surface in a vicinity of the NFC reader, the NFC tag embedded in the chip and a magnetized or magnetizable component is embedded in the chip such that the chip is magnetically attachable to the headphone to unlock and play audio content.

3. The headphone system according to claim 2, wherein:
the chip, the NFC tag, and the magnetized or magnetizable component have a radial symmetry and have an identical axis of symmetry, where the NFC tag and the magnetized or magnetizable component have a ring-shaped geometry; and
the magnetic surface of the headphone forms a base surface of a first cavity, where the first cavity includes a geometry which is suitable to affix the chip in the lateral direction.

4. The headphone system according to claim 3, wherein the base surface of the first cavity defines a second cavity such that the chip is tilted into the second cavity by applying pressure to the chip surface overlapping the second cavity to remove the chip from the headphone.

5. The headphone system according to claim 4, wherein the surface of the second cavity is not magnetic so that the chip attached to a magnetic base surface is pullable back to a magnetic base surface of the first cavity by magnetic pull force if it accidentally tilts into the second cavity.

6. The headphone system according to claim 2, wherein the magnet and the magnetized or magnetizable component are configured such that a noise at an ear of a user attaching the chip by the magnetic pull at the surface is below a threshold value, wherein the threshold value comprises a sound pressure level of between 85 dB and 100 dB.

7. The headphone system according to claim 6, wherein the headphone system further comprises at least one of:

the audio file stored on the memory is incomplete and is completed by a complementary audio file, where the headphone can only play complete audio files; and
the complementary audio file received is encrypted and the headphone is configured to decrypt the complementary audio file received, wherein the audio files stored on the memory are encrypted, and the headphone is to decrypt the audio files stored on the memory using the complementary audio files received.

8. The headphone system according claim 1, wherein when the NFC tag with the first identifier is brought into the communication range of the NFC reader, the headphone is to:
receive a complementary audio file from a chip embedding the NFC tag; and
supplement the audio file stored on the memory with the complementary audio file for the playback of the audio file.

9. Headphones comprising:
a memory to store a first audio file and a second audio file, wherein the first audio file is associated with a first identification and the second audio file is associated with a second identification, and wherein the first and second audio files are locked, such that access is only possible by a radio frequency identification (RFID) code including a third identification corresponding to the first or second identification of a respective audio file; and
a near field communication (NFC) reader to read the third identification of an NFC tag brought within communication range of the NFC reader of headphones, wherein the headphones are to:
compare the third identification of the NFC tag with the first or second identifications of audio files stored on the memory;
unlock a corresponding audio file in an event that the third identification of the NFC tag matches the first or second identifications of a stored audio file; and
automatically start playback of the corresponding audio file,
wherein the headphones include or are to cause at least one of the following:
the playback is to automatically stop when the NFC tag is removed from the communication range of the NFC reader;
the NFC tag is embedded in a chip that includes plastic;
the audio file played, the first identifier of the NFC tag, and a time stamp are recorded so that after an end of an ongoing playback, the playback of the audio file is continued seamlessly when the NFC tag is again brought within the communication range of the NFC reader; and
the headphones comprise an infrared sensor to detect whether the headphones are worn by a person and the automatic playback of the audio file takes place only if the infrared sensor detects that the headphones are being worn by the person.

10. The headphones according to claim 9, wherein:
the playback is to automatically stop when the NFC tag is removed from the communication range of the NFC reader;
the headphones comprise a magnet, including a magnetic surface, in a vicinity of the NFC reader so that a device, that has a magnetic or magnetizable component in addition to the NFC tag to unlock and play audio content, is attachable to the headphones;

the headphones are to record the file played, the third of the NFC tag, and a time stamp so that, after ending an ongoing playback, the playback of the audio file is continued seamlessly when the NFC tag is again brought within communication range of the NFC reader; and the one or more audio files are incomplete audio files, where an incomplete audio file of the one or more audio files is completed only by data that is read out via the NFC reader and audio content is played only after the completion of the incomplete audio file.

11. The headphones according to claim 10, further comprising a magnetic surface in a vicinity of the NFC reader, wherein the magnetic surface forms a base surface of a first cavity.

12. The headphones according to claim 11, wherein the base surface of the first cavity defines a second cavity such that a further magnetically attachable device can be tilted and thereby removable from the headphones.

13. The headphones according to claim 12, wherein the surface of the second cavity is not magnetic so that the device attached to a magnetic base surface can be pulled back to the magnetic base surface of the first cavity by magnetic attraction if it accidentally tilts into the second cavity.

14. A chip comprising plastic material with an embedded NFC tag to transmit a radio frequency identification (RFID) code containing an identifier of the NFC tag to an NFC reader when the chip is brought within a communication range of the NFC reader,
wherein the chip is attachable to a headphone of a headphone system comprising the NFC reader,
wherein playback of an audio file is to automatically stop when the NFC tag is removed from the communication range of the NFC reader,
wherein part of an audio file is stored on the chip, where the chip is capable of transmitting the part of the audio file to an NFC reader when the chip is brought within a communication range of the NFC reader, and
wherein at least one of:
the part of the audio file is encrypted and/or where the chip is configured to transmit the part of the audio file to the NFC reader in encrypted form;
audio content associated with the part of the audio file is played only based on supplementing the part of the audio file by way of a complementary audio file; and
the part of the audio file is stored in a flash memory, where the flash memory is completely encased with a material comprising plastic or a plant-based material.

15. The chip according to claim 14, further comprising:
a magnetized or magnetizable component that is embedded into the chip such that the chip is attachable to a surface by a magnetic pull force, wherein the chip, the NFC tag, and the magnetized or magnetizable component have a radial symmetry and have an identical axis of symmetry, where the NFC tag and the magnetized or magnetizable component have a ring-shaped geometry;
the chip, when brought within the communication range of the NFC reader, is to transmit to the NFC reader an RFID code corresponding to an orientation with respect to the NFC reader depending on orientation of the chip; and
the chip has a cylindrical geometry with a diameter that is between 40 millimeters and 55 millimeters and has a height of between 3 millimeters and 10 millimeters.

16. An audio output system to play audio content, comprising:
a chip comprising a near field communication (NFC) tag, where the NFC tag is associated with a first identifier, wherein a first partial file is stored on the chip; and
an audio output device comprising:
a memory to store one or more second partial files, where each of the one or more second partial files is associated with a second identifier; and
an NFC reader,
wherein, when the NFC tag is brought into proximity with the NFC reader, the audio output device is to:
read out the first identifier of the chip;
receive the first partial file from the chip;
determine a second partial file of the one or more second partial files based on the first identifier read out; and
automatically play audio content resulting from a combination of the first partial file from the chip and the determined second partial file of the one or more second partial files.

17. The audio output system according to claim 16, wherein the audio output system further comprises at least one of:
audio content associated with the second partial file is locked and can only be played by combining the first partial file and the second partial file;
the first partial file is stored in encrypted form on the chip and/or the first partial file is transmitted in encrypted form to the NFC reader, where the audio output device is to decrypt the first partial file based on the first identifier of the chip read out and/or the second partial file determined;
the one or more second partial files stored on the memory are encrypted, where the audio output device is configured to decrypt the determined second partial file based on the first identifier of the chip read out and/or the first partial file received;
the playback stops automatically when the NFC tag is removed from the communication range of the NFC reader; and
the audio output device is a headphone.

18. The audio output system according to claim 17, wherein the communication range includes 5 cm or less between the NFC tag and the NFC reader.

19. A headphone system, comprising:
a near field communication (NFC) tag with a radio frequency identification (RFID) code including a first identifier of the NFC tag;
a headphone, comprising:
a memory to store one or more audio files, wherein each of the one or more audio files are associated with a second identifier, and wherein access to the one or more audio files is locked, such that access is only possible by an RFID code containing the first identifier corresponding to the second identifier of a respective audio file; and
an NFC reader, wherein, when the NFC tag including the first identifier corresponding to the second identifier of the respective audio file is brought within communication range of the NFC reader, the headphone is to:
process the RFID code including the first identifier of the NFC tag;
correlate the first identifier of the NFC tag with the second identifier of the audio file stored in the memory;

unlock the audio file; and automatically start playback of the audio file, wherein the headphone comprises a magnet, including a magnetic surface, in a vicinity of the NFC reader so that a device, that has a magnetic or magnetizable component in addition to the NFC tag to unlock and play audio content, is attachable to the headphone;

the headphone is to record the file played, the first identifier of the NFC tag, and a time stamp so that, after ending an ongoing playback, the playback of the audio file is continued seamlessly when the NFC tag is again brought within communication range of the NFC reader; and the one or more audio files are incomplete audio files, where an incomplete audio file of the one or more audio files is completed only by data that is read out via the NFC reader and audio content is played only after the completion of the incomplete audio file.

20. Headphones comprising:

a memory to store a first audio file and a second audio file, wherein the first audio file is associated with a first identification and the second audio file is associated with a second identification, and wherein the first and second audio files are locked, such that access is only possible by a radio frequency identification (RFID) code including a third identification corresponding to the first or second identification of a respective audio file; and a near field communication (NFC) reader to read the third identification of an NFC tag brought within communication range of the NFC reader of headphones, wherein the headphones are to:

compare the third identification of the NFC tag with the first or second identifications of audio files stored on the memory;

unlock a corresponding audio file in an event that the third identification of the NFC tag matches the first or second identifications of a stored audio file; and automatically start playback of the corresponding audio file, wherein:

the playback is to automatically stop when the NFC tag is removed from the communication range of the NFC reader, wherein, the headphones comprise a magnet, including a magnetic surface, in a vicinity of the NFC reader so that a device, that has a magnetic or magnetizable component in addition to the NFC tag to unlock and play audio content, is attachable to the first or second headphone;

the headphones are to record the file played, the first identifier of the NFC tag, and a time stamp so that, after ending an ongoing playback, the playback of the audio file is continued seamlessly when the NFC tag is again brought within communication range of the NFC reader; and the one or more audio files are incomplete audio files, where an incomplete audio file of the one or more audio files is completed only by data that is read out via the NFC reader and audio content is played only after the completion of the incomplete audio file.

* * * * *